April 25, 1939. L. C. HUCK Re. 21,058

RIVET AND METHOD OF SETTING THE SAME

Original Filed June 17, 1931

INVENTOR
LOUIS C. HUCK.
BY
Harness, Dickey, Pierce & Hamm
ATTORNEYS.

UNITED STATES PATENT OFFICE 21,058

RIVET AND METHOD OF SETTING THE SAME

Louis C. Huck, Grosse Pointe, Mich., assignor to Huxon Holding Corporation, Detroit, Mich., a corporation of Michigan Original No. 2,030,165, dated February 11, 1936, Serial No. 545,004, June 17, 1931. Application for reissue July 22, 1937, Serial No. 155,146

47 Claims. (Cl. 218—29)

The invention relates to devices for securing structural elements together and it has particular relation to a rivet, and a method of riveting.

The principal objects of the invention are to provide an improved rivet for securing a plurality of structural elements together, which can be applied from one side of the structure being riveted; to provide a novel construction of rivet which can be manufactured inexpensively and quickly utilized for securing structural elements together; and to provide a method of forming and applying a rivet which enables a single workman to quickly rivet a structure from one side thereof.

For a complete understanding of the invention reference may be had to the accompanying drawing forming a part of the specification, wherein.

Figure 2:
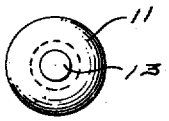
Fig. 2 is an end view of the rivet shown by Fig. 1, taken from the left side thereof.
Figure 1:
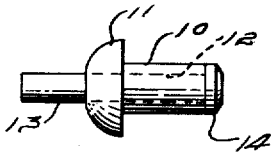
Figure 1 is a view of a rivet constructed according to one form of the invention, prior to application of the rivet to a structure to be riveted.
Figure 3:
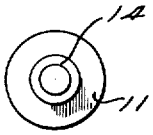
Figure 4:
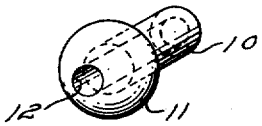
Figure 5:
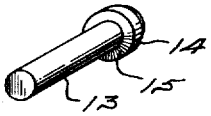
Figure 6:
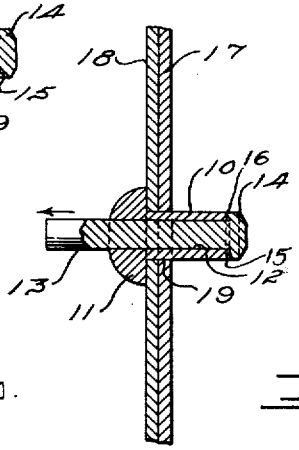
Figure 7:
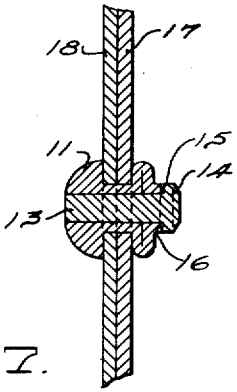
Figure 8:
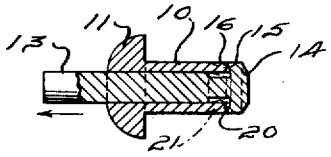

Fig. 3 also is an end view of the construction shown by Fig. 1, but taken from the right side thereof;

Figs. 4 and 5 are perspective views, illustrating respectively, the parts of the rivet shown by Fig. 1;

Fig. 6 is a cross-sectional view of a structure to be riveted, illustrating the initial application of the rivet thereto;

Fig. 7 is a cross sectional view similar to that shown by Fig. 6 illustrating the rivet after it has finally been applied to the structure;

Fig. 8 is a longitudinal cross-sectional view of a modified form of rivet which may be used.

Figure 9:
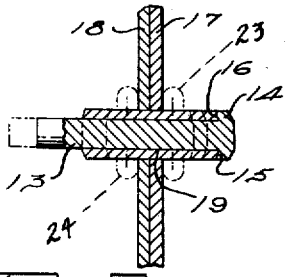
Figure 10:
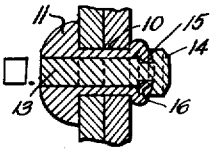

Fig. 9 is a cross-sectional view similar to that shown by Fig. 6, illustrating another form of rivet and its application;

Fig. 10 is a cross-sectional view illustrating the rivet shown by Fig. 8 after the rivet has been set.

Referring to Figs. 1 and 4, the rivet comprises a cylindrical metal body portion 10 which at one end is provided with a conventional spheroidal rivet head indicated at 11. Both the body portion 10 and the head 11 are provided with a longitudinally extending, centrally located opening 12 which is substantially of cylindrical form. The construction just described may be considered as the female part of the rivet. The male part of the rivet comprises a cylindrical metal shank 13 which is of such dimensions that it will have a press fit with the sides of the opening 12 formed in the female member. One end of the shank 13 is provided with a head 14, the outer diameter of which is substantially equal to the outer diameter of the cylindrical body portion 10 of the female member. When the male member is inserted through the opening 12 in the female member, it will have a press fit in such opening and the head 14 on the male member will have a peripheral surface which approximately constitutes in effect a continuation of the cylindrical surface of the body portion 10 of the female member.

As best shown by Fig. 6, the side wall of the head 14 adapted to engage the end of the body portion 10 of the female member, is countersunk, as indicated at 15, and the surface thus formed, engages a chamfered or conical end surface 16 formed on the end wall of the body portion 10. Preferably the female member is constructed of metal relatively ductile as compared to the metal in the male member and as a particular example of the metals which may be used, the female member may be constructed of aluminum while the male member may be constructed of Duralumin. When the members are constructed of such materials the female member will be less corrosive, while the male member will corrode more rapidly than the female member. This is desirable because the female element has a greater exposed surface which may be subjected to elements tending to produce corrosion. By constructing the male member of a more corrosive but stronger metal such an Duralumin, and the female member of a less corrosive but slightly weaker metal, such as aluminum, a desirable metal combination is obtained as the male member will considerably increase the strength of the rivet while the female member will prevent undesirable corrosion.

In riveting a pair of plates 17 and 18 for example, *a* shown by Fig. 6, initially both plates are formed with aligned openings 19, the diameter of which is substantially equal to the outer diameter of the body portion 10 of the female member and the peripheral surface of the head 14 on the male member. Then the male and female members as assembled in Fig. 1, initially are applied by moving the body portion 10 and the head 14 of the members through the opening 19 formed in the plates. It will be noted that this operation is performed at the outer side of plate 18 which may be considered as the working side of the structure. Then by means of suitable device or instrument provided for the purpose, the head 11 on the female member is maintained against the surface of plate 18, while the shank 13 projecting outwardly beyond the end of the rivet head 11, is pulled outwardly through the opening 12 formed in the female member. Since the head 14 on shank 13 engages the chamfered end of the body portion 10 of the female member, it is apparent that as the end of the shank 13 is pulled through the opening 12 in this manner, the body portion of the female member on the outer side of the plate 17, must in effect be reduced in length. The result is that the portion of the body 10 between the outer surface of plate 17 and the head 14 on the male member, is expanded or buckled. When the shank 13 has been moved a desired amount, the portion of the body 10 of the female member outwardly of the outer surface of plate 17, finally assumes a buckled shape illustrated in Fig. 7. Providing the adjacent walls of the head 14 and the outer end of the body portion 10 with complementary inclined surfaces, facilitates buckling the body portion of the female member in the manner previously described, and prevents movement of the head 14 through the opening because the head will tend to retain the end wall portion of the body against the shank. After the rivet has so been applied, the end of the shank projecting beyond the outer surface of the head 11 of the female member 10, is severed from the remainder of the shank, for the purpose of providing a smooth rivet head.

It is apparent during application of the rivet in this manner, that the head 11 on the female member withstands the reaction of the forces exerted by the head 14 on the male member against the end of the body portion 10 of the female member opposite the head 11, and also those forces exerted by application of the tool to the head and consequently the plates 17 and 18 are not subjected to any undesirable stresses. Also it is apparent that the rivets can be applied entirely from one side of one of the plates, as for example, referring to Fig. 6, the rivet may be applied entirely from the outer surface of plate 18 and it is not necessary to have any contact with that part of the rivet projecting beyond the outer surface of plate 17 or even see the outer surface of plate 17 and the part of the rivet projecting therefrom. Having an initial press fit between the shank 13 of the male member and the opening 12 in the female member is desirable because the members are maintained in assembled relation prior to and after applying the rivet. Also the press fit between the shank and female member, results in an air and water tight rivet which of course is desirable at least under most conditions. When the shank is pulled through the opening 12 in the female member, it tends to reduce in diameter, thereby reducing friction between the members. It is to be understood, however, that the diameter of the shank of the male member and the wall thickness of the body portion 10 of the female member are so proportioned that the female member will buckle before the male member receives any permanent deformation. Then when the pull on the male member is released, it returns substantially to its original diameter, and the male member has a final press fit in the opening in the female member. While the proportionate dimensions of the shank and body portion 10 of the female member, may be predetermined to insure desired deformation of the female member before that of the shank, the latter result may be obtained or modified by using metals having different strengths.

In the construction shown by Figure 8, the shank 13 adjacent the head 14 thereon has an annular recess or groove 20, thereby providing a space between the end of the body portion 10 and the shank. When the shank is pulled through the opening in the body portion 10, the extreme end wall of the latter will be crimped into the space 20 in the manner indicated at 21. This, therefore, locks the end of the body portion to the head 14 on the shank and further insures deformation of the intermediate part of the body as a constant pull is exerted on the shank. It furthermore is evident that crimping of the end of the body portion 10 into the groove or space 20 will reinforce this end and provide increased resistance to expansion when the intermediate part of the projecting portion of the body is expanded. Expansion of this intermediate part of the projecting portion of the body is in the nature of a bulbing action, in that the continuously annular wall is enlarged in diameter while the portion at opposite ends is held against expansion. The undercut face on the head of the pin and also the taper on the end of the tubular body provide a condition that at least to a certain extent causes the axial forces applied to the end of the body through the head on the pin to be directed towards the axis of the rivet while being applied in a general axial direction. This is of assistance in properly forming the bulbed head and furthermore the tapered engagement between the head and the end of the body operates to hold the end of the body against any tendency to expand through the bulbing operation.

In the construction shown by Fig. 9, the rivet comprises a tubular body portion which instead of having a head or enlarged portion as shown at 11 in Fig. 1, is substantially of uniform diameter throughout its length. Both ends of the body portion are preferably chamfered or beveled as indicated at 15. The rivet includes a shank 13 like that shown by Fig. 1 which likewise has a head 14 preferably provided with a countersunk wall 16 adapted to engage one chamfered end of the body portion, while the other end of the shank projects beyond the opposite end of the body portion. As in the other constructions described, the shank has a press fit in the opening in the body portion. In applying the rivet for connecting plates 17 and 18, a suitable tool or instrument is employed for engaging and buckling the end of the body portion opposite the end engaging the shank head 14, and for pulling the shank outwardly beyond the first mentioned end of the body portion. During this operation, the head 14 on the shank expands or buckles the body portion at the outer side of the plate 17 as indicated at 23 in broken lines, while the tool moving the opposite end of the body portion toward plate 18, buckles this portion as indicated at 24. Then the projecting end of the shank is severed, leaving the remaining portion press fitted in the opening of the body portion.

It is apparent from the previous description, that a novel rivet and method of riveting structure elements together have been provided and that the rivets may be applied entirely from one side of the structure being riveted. Also it is apparent that when the rivet is finally associated with the structure, the structural elements are positively maintained together and the male member disposed in the opening in the female member, has a tight or press fit with the sides of such opening. Also it will be apparent that a single workman may apply rivets of the kind described, by using a suitable tool for holding the rivet head 11 and exerting a pull on the shank 13 and that the tool may easily be manipulated by a single workman because holding the rivet head and pulling the shank in this manner are effected at substantially the same points and at one side of the structure being riveted. The use of a relatively ductile metal for the female member as compared to the metal used in the male member, is advantageous because the walls of the body portion of the female member may have a substantial thickness while at the same time the member will buckle prior to any permanent deformation of the male member. Since the male member is not apt to be subjected to elements that will effect corrosion of the metal, as much as the female member, it is advantageous to have the female member constructed of metal less corrosive as compared to the corrosive properties of the male member. Riveting in the manner previously described is desirable particularly in conjunction with structures having one surface which is not readily accessible and it is manifest in this event that the rivets may be applied at that surface which is accessible while at the same time the rivets will positively secure the structure elements together and will have a head on that surface of the structure which is inaccessible. Constructing the rivet of light metal such as Duralumin and aluminum also has another advantage in that the rivets may be used in conjunction with aircraft wherein the weight of the craft must be kept at a minimum. Using a rivet which resists corrosion is desirable, particularly in aircraft, when the latter operates near salt water, because the air near salt water usually promotes corrosion of metal.

Although only one form of the invention has been illustrated and described in detail, it will be apparent to those skilled in the art that various modifications may be made without departing from the scope of the appended claims.

What I claim is:

1. A rivet comprising a body portion composed of aluminum, and having an opening therein, and a shank in such opening, which is composed of Duralumin.

2. A rivet comprising a tubular female member, a male member extending through the female member and having a head engaging one end of the latter, and means comprising a recess in one of the members for allowing radial contraction of the end portion of the female member adjacent the head on the male member, when such head is urged against the end of the female member.

3. A rivet comprising a tubular female member having a portion adapted to be expanded into a head by axial forces applied to opposite ends of the member, and a male member extending through the female member and having means on one end for operatively engaging one end of said portion for applying axial forces to such end, said male member having a recess in its surface for permitting radial upsetting of a portion of the female member into the recess when axial forces are applied to opposite ends of the female member.

4. A rivet comprising a tubular female member, a male member extending through the female member and having a head for engaging one end of said female member, said male member having a groove in its surface adjacent the other member and at a point adjacent the head on the male member for permitting radial contraction of that end of the female member adjacent the head on the male member, and means on the head of the male member for radially contracting the adjacent end of the female member upon urging said head against the latter.

5. A rivet comprising a tubular body having a continuously annular wall adapted to be bulbed into an annular head defined by folded wall portions, a shank extending through the body and having a head at one end of substantially the same diameter as the outer diameter of the body for applying axial forces to one end of the latter, the other end of the shank projecting beyond the other end of the body, and means including such shank for causing bulbing out of the intermediate portion of the body when the shank is pulled through the latter, said means including means for holding the first end of the body and preventing any substantial flaring out of said end.

6. The method of riveting which comprises providing a tubular member having a continuously annular body portion and a shank extending through the member and which projects beyond one end thereof and has a head for applying axially compressive forces against the outer end of the body portion, which comprises holding the end of the body portion adjacent the projecting end of the shank, pulling the latter end of the shank and applying axially compressive forces to the outer end of the body portion through said head while simultaneously causing the forces applied to said outer end of the body portion to be directed at an angle to and towards the axis of the rivet, and continuing the pull to form an annular outwardly bulbed head from said body portion between the ends and inwardly at the outer end of the latter.

7. A rivet comprising a tubular body for extending through openings in a structure to be riveted, said body having a head at one end for engaging one side of the structure and at its other end a continuously annular tubular wall bulbed outwardly by radial expansion to form an annular head defined by folded wall portions for engaging the opposite side of the structure, and a shank member extending through the body and having a head engaging the bulbed head.

8. In combination, a plurality of structural elements, a tubular body extending through openings in the elements and having a head at one end engaging one side of the structure and at its other end a continuously annular tubular wall bulbed outwardly by radial expansion to form an annular head defined by folded wall portions at the opposite side of the structure and a shank member extending through the body and having a head engaging the bulbed head.

9. The method of riveting which comprises providing a member having a continuously annular wall open at one end and with a head at the opposite end, and a pin extending through the member, inserting the assembly through openings in structural elements to be riveted, and forming an annular, bulbed head defined by folded wall portions out of the tubular part at the side of the structure by applying axially compressive forces against opposite ends of the wall to cause the tubular part to radially expand.

10. A rivet comprising a tubular body having a continuously annular wall portion, a shank projecting into said body and having a head on one end for applying axial forces against one end of the annular wall portion and means for causing bulbing of the annular wall portion intermediate its ends when the shank is moved axially in the body and relative thereto, said means including means for holding said one end of the annular wall portion against outward expansion during such movement of the shank.

11. A rivet comprising a member having a tubular portion defined by a continuously annular wall which is radially expanded intermediate its ends to form a bulbed head defined by continuously annular folded wall portions, and a shank extending into and fitting tightly in the tubular portion to form in effect a solid rivet.

12. A rivet comprising a body having a tubular portion defined by a continuously annular wall which is radially expanded intermediate its ends to form a bulbed head defined by continuously annular folded wall portions, a shank extending into and fitting in the tubular portion to form in effect a solid rivet, and means locking the shank and body against relative axial movement.

13. In combination, a structure having an opening, a rivet comprising a tubular member extending through the opening and having a head at one end engaging one side of the structure, and a continuously annular, tubular portion at its other end which is bulbed outwardly against the opposite side of the structure into a bulbed head defined by annular folded wall portions, as a result of axially compressive forces directed against the ends of the member, and a pin projecting into the member in tight relation thereto so as to provide in effect a sealed rivet.

14. In combination, a structure having an opening, a rivet inserted and set from one side of the structure comprising a tubular member extending through the opening and having a head at one end engaging one side of the structure and a continuously annular tubular portion at its other end which is bulbed outwardly against the opposite side of the structure to form a bulbed head defined by annular folded wall portions, as a result of axially compressive forces applied to the ends of the member, and a pin extending through the tubular member and having a head engaging the bulbed end thereof, said head on the pin being of such dimensions as to pass through the opening, so as to enable insertion of the assembly in the opening and from the side on which the first head on the tubular member is disposed, prior to the bulbing operation, the rivet being set by pull on the pin and application of the reactionary force to the first head on the tubular member, from the insertion side of the structure.

15. The method of riveting a structure which comprises providing a rivet comprising a tubular member having a body portion adapted to be inserted from one side into an opening in the structure and to project beyond the other side of the latter, and a pin extending through the tubular member and beyond both ends thereof and having a head at one end engaging such projected end of the tubular member and which head is also passable through the opening, and setting the rivet after the assembly is so inserted by pulling that end of the pin opposite its head and applying the reactionary force to the same end of the tubular member, to axially compress the projecting tubular portion into an outwardly bulbed head defined by continuously annular folded wall portions.

16. A rivet adapted to be inserted and set from one side of a structure to be riveted, comprising a tubular member adapted to be inserted in an opening in the structure and having a continuously annular tubular portion adapted to project from that side of the structure opposite the insertion side and to be bulbed by axial compression into a continuously annular head, a pin projecting through the tubular member and projecting from the end thereof opposite the portion to be bulbed, means on the opposite end of the pin for axially moving the outer end of the tubular member when the projecting portion of the pin is pulled axially of the tubular member and the reactionary force is applied to the adjacent end of the latter, and means for holding the outer end of said portion of the tubular member against expansion, whereby the portion will be bulbed or expanded inwardly of said end.

17. A rivet adapted to be inserted and set from one side of a structure to be riveted, comprising a tubular member adapted to be inserted in an opening in the structure, having a head for engaging the structure at the insertion side, and having a continuously annular tubular portion adapted to project from the opposite side of the structure and to be bulbed by axial compression into a continuously annular head defined by folded wall portions, a pin projecting through the tubular member and projecting from said first head on the tubular member to provide a gripping portion and also having a head on its opposite end for applying axial force to the outer end of said tubular portion, the outer diametrical dimensions of the head substantially corresponding to those of said tubular portion, and means for holding the outer end of said tubular portion against expansion, from which it follows that the assembly may be inserted and set from one side and by pulling the projecting end of the pin and applying the reactionary force against the first head on the tubular member, the tubular portion may be bulbed inwardly of said outer end thereof.

18. A rivet comprising a cylindrical body having a short bevel on one of its end walls, a shank in the body, and a head on the shank adjacent the bevelled end of the body, said head having an undercut portion adapted to engage the bevel on the body, said undercut extending inwardly toward the axis of the shank beyond the inner extent of the bevel on the body.

19. In combination, a rivet member having a portion adapted to project through openings in a structure to be riveted, a tubular portion having a continuously annular wall adapted to project from one side of the structure, a member adapted to enter the outer end of the latter portion, a head on the latter member for operatively engaging the end face of the tubular portion and for applying axial forces thereagainst and toward the structure to outwardly bulb the tubular portion mentioned, and means for maintaining the end face of the tubular portion in substantially full operative engagement with said head during the application of such forces and outward bulbing of the tubular portion, said means including means for preventing outward expansion of the end sector of the tubular portion adjacent said face.

20. The method of riveting which comprises providing a rivet having a tubular body adapted to extend through an opening in a structure to be riveted and a continuously annular portion at one end adapted to project beyond one side of the structure, and a pin extending through the body and projecting beyond the other end thereof and having means for applying axial forces to the outer end of said annular portion, and setting the rivet after the assembly is inserted in the opening by pulling said projecting portion of the pin, applying the reactionary force to the adjacent end of the body, and simultaneously holding the outer end of said projecting annular portion against expansion so as to cause bulbing of such portion intermediate its ends into a head.

21. The method of riveting which comprises providing a rivet having a tubular body adapted to extend through an opening in a structure to be riveted and a continuously annular portion at one end adapted to project beyond one side of the structure, and a pin extending through the body and projecting beyond the other end thereof and having means for applying axial forces to the outer end of said tubular portion, and setting the rivet after the assembly is inserted in the opening by pulling said projecting portion of the pin, applying the reactionary force to the adjacent end of the body and simultaneously holding the outer end of said projecting tubular portion against expansion so as to cause bulbing of such portion intermediate its ends into a head defined by continuously annular and folded wall portions.

22. A method of riveting which comprises providing a rivet having a tubular body adapted to extend through an opening in a structure to be riveted, a head at one end for engaging one side of the structure, a continuously annular portion at its other end adapted to project beyond the other side of the structure, and a pin extending through the body and projecting beyond the head thereon and having means for applying axial forces to the outer end of the projecting tubular portion of the body, and setting the rivet after the assembly is inserted in the opening by pulling said projection portion of the pin, applying the reactionary forces to the head on the tubular body, and simultaneously holding the outer end of said projecting tubular portion against expansion so as to cause bulbing of such portion intermediate its ends into a head defined by continuously annular folded wall portions.

23. A rivet comprising a body portion of aluminum having an opening therein, and a shank in such opening which is composed of a light aluminum alloy containing a large percent of aluminum and which is less ductile than the metal in the body portion.

24. In combination, a structure having openings, a tubular rivet member extending through such openings and having a head engaging one side of the structure and a continuously annular tubular part at the other side of the structure which is radially expanded between its outer end portion and the structure with such outer end portion remaining substantially non-expanded and substantially in its original shape and condition so as to provide a continuously annular head engaging said other side of the structure, and a shank extending into and tightly fitting the tubular member to form in effect, a solid and sealed rivet.

25. The method of riveting which comprises providing a tubular member having a head on one end adapted to engage one side of a structure to be riveted and a continuously annular portion adapted to project beyond the opposite side of the structure, providing a pin for extension through the tubular member and which has means at one end for applying axial force to the outer end of said tubular portion and which is adapted at its other end to project beyond the first head on the tubular member, inserting the assembly in the structural openings, pulling and projecting end of the pin while holding the first head on the tubular member so as to axially compress said tubular portion and expand it intermediate its ends into a head engaging the side of the structure, and holding the outer end of said tubular portion substantially against the pin and against expansion during pulling of the latter.

26. The method of riveting which comprises providing a tubular member applying forces to opposite ends of the member to deform one end thereof into a reinforcing part, and applying forces through the latter to form a head between such part and the other end of the member.

27. The method of riveting which comprises providing a tubular member, applying forces to opposite ends of the member to deform one end thereof into a reinforcing part, and applying forces through the latter to form a bulb between such part and the other end of the member.

28. The method of riveting which comprises providing a tubular solid wall member, applying forces to opposite ends of the member to deform one end thereof into a reinforcing part, and applying forces through the latter to form a bulb between such part and the other end of the member.

29. The method of riveting which comprises providing a tubular member, providing a shank for extending through the tubular member, providing a head on one end of the shank for engaging one end of such tubular member, assembling the parts, inserting the assembly through openings in a structure to be riveted, then increasing the bursting strength of that end of the tubular member adjacent the shank head, and bulbing the tubular member between the structure and its end having increased bursting strength.

30. The method of riveting which comprises providing a tubular member with a head at one end and a tubular body portion, inserting the member in openings of a structure to be riveted, then increasing the inherent bursting strength of the other end of such body portion, and bulbing out a portion of the body intermediate its ends and adjacent the portion of increased bursting strength.

31. The method of riveting which comprises providing a tubular member with a body portion adapted to be bulbed, inserting the member in openings of a structure to be riveted, then increasing the radial extent of one end of such body portion to increase its bursting strength, and then bulbing the body while holding the other end against bursting.

32. The method of riveting which comprises providing a tubular member with a body portion adapted to be bulbed, inserting the member in openings of a structure to be riveted, then increasing the radial extent of one end of the body portion to increase the bursting strength thereof, and then bulbing the body portion by compressive forces axially directed against its ends.

33. A rivet comprising a tubular member having a continuously annular wall portion, a shank extending through the tubular member and having a head engaging one end of the latter, and means on the members for first causing during the rivet setting operation the formation of a reinforcing part at the end of the female member head, and then bulbing of the body part of such female member.

34. The method of riveting which comprises providing a tubular member with a head at one end and a tubular body portion, inserting the member in openings of a structure to be riveted, then increasing the inherent bursting strength of the other end of the body portion, and then bulbing out a portion of the body intermediate its ends.

35. The method of riveting which comprises providing a tubular member with a body portion having a maximum diameter predetermined to allow its insertion into structural openings, inserting such member into structural openings, applying forces to one end of the member to substantially increase the radial extent of the end wall portion and hence increase the bursting strength thereof, and applying additional forces through such end wall portion to expand an intermediate wall portion of the member.

36. In a rivet, the combination with a tubular female member and a male shank member extending therethrough and having a head portion at one end engaging one end face of said tubular member, the intermediate portion of said tubular member being adapted to be bulbed outwardly by longitudinal movement of said shank member toward the opposite end of said tubular member, of means on said tubular member engaged by said head portion upon initial movement thereof for forming a reinforcing portion on said tubular member to prevent said head portion drawing through said tubular member during said subsequent bulbing of the intermediate portion thereof.

37. The method of riveting which comprises, providing a tubular member, providing a shank extending therethrough and having a head engaging one end of said tubular member, inserting said tubular member with the shank therein through openings in a structure to be riveted, and subsequently forming a reinforcing portion on said end of said tubular member prior to bulbing of said tubular member between the structure and said end.

38. The method of riveting which comprises providing a tubular member having a shank member extending therethrough provided with a head engaging one end of said tubular member, inserting the assembly through openings in a structure to be riveted, and then forming a reinforcing portion at the said end of the tubular member to prevent the head of said shank member from pulling through said tubular member upon subsequent bulbing of the portion of said tubular member between the structure and said reinforced portion.

39. A rivet comprising a tubular member and a shank member extending therethrough and having a head engaging one end of said tubular member, said tubular member having an intermediate portion adapted to be outwardly bulbed upon relative movement between said members and including means at said end adapted to be formed into a reinforcing portion upon initial relative movement between said members prior to said bulbing of said intermediate portion.

40. In combination, a rivet member having a portion adapted to project through openings in a structure to be riveted, a tubular portion having a continuously annular wall adapted to project from one side of the structure, a member adapted to enter the outer end of the latter portion, means on the latter member for engaging the end face of the tubular portion and for applying axial forces thereagainst and toward the structure, to outwardly bulb the tubular portion mentioned, and means for maintaining the outer or free end of the tubular portion substantially parallel to the axis of the rivet during the application of such forces and bulbing of the tubular portion between such end and the structure.

41. In combination, a rivet member having a portion adapted to project through openings in a structure to be riveted, a tubular portion having a continuously annular wall adapted to project from one side of the structure, a member adapted to enter the outer end of the latter portion, means on the latter member for engaging the end face of the tubular portion and for applying axial forces thereagainst and toward the structure, to outwardly bulb the tubular portion mentioned, and means for maintaining the end face of the tubular portion in substantially its original form during the application of such forces and formation of the bulb.

42. A rivet as an article of manufacture which is adapted to be inserted and set from one side of a structure to be riveted, comprising a tubular rivet member, a shank member extending through such tubular member, and a head on such shank extending axially over an end of such tubular member, the dimensions of such head being such as to permit initial insertion thereof through the opening in the structure to be riveted.

43. A rivet adapted to be inserted and set from one side of a structure to be riveted, comprising a tubular member having a portion adapted to be bulbed outwardly by axial compression of the member, a shank extending through the tubular member, and means on one end of the shank and axially extending over an end sector of the tubular member to positively hold it against substantial deformation during the bulbing action.

44. A rivet comprising a pin adapted to project through a structure to be riveted and having a portion adapted to extend beyond one side of the structure, a tubular means on the projecting portion of the pin and having a continuously annular wall, means on the pin for applying axial forces to the end of the wall so as to bulb it intermediate its ends into an annular head, and means at the outer end of said tubular means for holding said end of the wall against expansion when said axial forces are applied to bulb the tubular means.

45. A rivet comprising a pin adapted to project through a structure to be riveted and having a portion adapted to project beyond the side of the structure, tubular means on the pin including a portion adapted to project into the opening in the structure to be riveted and a continuously annular portion on that portion of the pin adapted to project from the structure, means on the pin for applying axial forces to the end of the wall to bulb it intermediate its ends into a continuously annular head, and means at the outer end of said continuously annular portion for substantially preventing the expansion of said end during application of said forces.

46. The method of riveting which comprises providing a member projecting through openings in a structure to be riveted and which at one end has a continually annular tubular portion projecting beyond one side of the structure, providing a pin which projects into the tubular portion and which engages the latter at a point spaced from the structure for applying axially compressive forces to such tubular portion, and applying axial forces to move the pin in a direction to axially compress said tubular portion while applying opposing axial forces to the other end of the member to cause bulbing of said tubular portion into an annular head defined by axially folded walls while simultaneously preventing outward expansion of the outer end part of said tubular portion.

47. The method of riveting which comprises providing a member having a flange on one end thereof and having an integral elongated sleeve portion with a continuously annular tubular wall open at both ends, inserting said sleeve portion through openings in a structure to be riveted with the flange engaging one side of said structure and the sleeve projecting beyond the other side of the structure, engaging the projecting sleeve portion at a point spaced from said structure by a tension member projecting from the flange end of the tubular member and which extends into the tubular member and into the sleeve portion projecting from said other side of the structure, and pulling the end of the tension member projecting from the flange end of the tubular member while applying the reactionary force against said flange to cause annular bulbing of the projecting portion of the sleeve intermediate said structure and the point of engagement of the tension member with the projecting sleeve portion so as to form an annular head defined by axially folded walls.

LOUIS C. HUCK.

CERTIFICATE OF CORRECTION.

Reissue No. 21,058. April 25, 1939.

LOUIS C. HUCK.

It is hereby certified that error appears in the printed specification of the above numbered patent requiring correction as follows: Page 5, first column, line 72, claim 25, for the word "and" read the; and that the said Letters Patent should be read with this correction therein that the same may conform to the record of the case in the Patent Office.

Signed and sealed this 13th day of June, A. D. 1939.

Henry Van Arsdale (Seal) Acting Commissioner of Patents.